(12) United States Patent
Anderson et al.

(10) Patent No.: US 10,710,745 B2
(45) Date of Patent: Jul. 14, 2020

(54) ENGINE DRIVEN AIR COMPRESSOR SYSTEM FOR A MOBILE AVIATION SUPPORT CART

(71) Applicant: Voltaire Incorporated, Oxnard, CA (US)

(72) Inventors: Robert B. Anderson, Camarillo, CA (US); Brian K. Dalton, Ventura, CA (US)

(73) Assignee: VOLTAIRE INCORPORATED, Oxnard, CA (US)

( * ) Notice: Subject to any disclaimer, the term of this patent is extended or adjusted under 35 U.S.C. 154(b) by 217 days.

(21) Appl. No.: 15/697,921

(22) Filed: Sep. 7, 2017

(65) Prior Publication Data

US 2018/0065760 A1    Mar. 8, 2018

Related U.S. Application Data

(60) Provisional application No. 62/384,949, filed on Sep. 8, 2016.

(51) Int. Cl.
| | |
|---|---|
| *B64F 1/36* | (2017.01) |
| *F02B 63/06* | (2006.01) |
| *F02B 63/04* | (2006.01) |
| *F04D 29/58* | (2006.01) |
| *F04D 27/00* | (2006.01) |
| *H02K 7/18* | (2006.01) |
| *F04D 25/16* | (2006.01) |
| *F16H 57/04* | (2010.01) |

(52) U.S. Cl.
CPC ............ *B64F 1/364* (2013.01); *F02B 63/042* (2013.01); *F02B 63/06* (2013.01); *F04D 25/163* (2013.01); *F04D 27/002* (2013.01); *F04D 29/5826* (2013.01); *H02K 7/1815* (2013.01); *F16H 57/0404* (2013.01)

(58) Field of Classification Search
CPC ........ B64F 1/364; F02B 63/042; F02B 63/06; F04D 25/163; F04D 27/002; F04D 29/5826; H02K 7/1815; F25B 1/10; F16H 57/0404
USPC .......................................... 62/402
See application file for complete search history.

(56) References Cited

U.S. PATENT DOCUMENTS

| | | | | |
|---|---|---|---|---|
| 2,696,079 A | * | 12/1954 | Kappus | F02K 1/58 244/74 |
| 2,988,884 A | * | 6/1961 | Pouit | F02C 3/00 60/39.17 |
| 3,289,402 A | * | 12/1966 | Jung | F01K 7/40 60/39.182 |

(Continued)

OTHER PUBLICATIONS

CAVOTEC; PCAir System datasheet; Aug. 17, 2017; 2 pages; www.cavotec.com.

*Primary Examiner* — Tho V Duong
*Assistant Examiner* — Raheena R Malik
(74) *Attorney, Agent, or Firm* — Brooks Kushman P.C.

(57) ABSTRACT

A multi-stage, intercooled centrifugal compressor with integral power generator system for a mobile, ground-based aviation support cart is disclosed. A bootstrap-type turbo compressor module which can supply cooled air. The system may be operated in one of several modes: high pressure "bleed air" (e.g., 35-50 psig) for jet engine start, conditioned or cooled air (e.g., 2-5 psig) for aircraft cooling purposes, or electrical ground power. Electrical ground power and conditioned air may also be supplied simultaneously if desired.

17 Claims, 9 Drawing Sheets

(56) References Cited

U.S. PATENT DOCUMENTS

| | | | | |
|---|---|---|---|---|
| 3,355,096 | A | 11/1967 | Hornschuch | |
| 3,428,242 | A | 2/1969 | Rannenberg | |
| 4,751,814 | A * | 6/1988 | Farrell | F02C 1/04 60/39.183 |
| 4,896,499 | A * | 1/1990 | Rice | F01D 5/185 60/39.182 |
| 5,014,518 | A | 5/1991 | Thomson et al. | |
| 5,133,188 | A * | 7/1992 | Okada | F02B 37/04 123/561 |
| 5,214,935 | A | 6/1993 | Brunskill | |
| 5,386,685 | A * | 2/1995 | Frutschi | F01K 23/106 60/39.182 |
| 5,678,401 | A * | 10/1997 | Kimura | F01K 23/103 60/39.182 |
| 5,884,470 | A * | 3/1999 | Frutschi | F01K 21/047 60/39.182 |
| 5,899,085 | A | 5/1999 | Williams | |
| 6,070,418 | A | 6/2000 | Crabtree et al. | |
| 6,128,909 | A * | 10/2000 | Jonqueres | B64D 13/06 62/402 |
| 6,223,523 | B1 * | 5/2001 | Frutschi | F01K 21/042 60/39.182 |
| 6,427,471 | B1 | 8/2002 | Ando et al. | |
| 6,460,353 | B2 | 10/2002 | Udobot et al. | |
| 6,526,775 | B1 * | 3/2003 | Asfia | B64D 13/06 62/402 |
| 6,527,228 | B2 | 3/2003 | Mitani | |
| 8,055,388 | B2 | 11/2011 | Mann, III et al. | |
| 8,109,116 | B2 * | 2/2012 | Sekiya | F01C 1/0223 62/192 |
| 8,117,864 | B2 | 2/2012 | Montminy et al. | |
| 8,523,530 | B2 | 9/2013 | Merritt et al. | |
| 8,529,210 | B2 | 9/2013 | Merritt et al. | |
| 8,851,835 | B2 | 10/2014 | Merritt et al. | |
| 2007/0157595 | A1 * | 7/2007 | Lockwood, Jr. | F02C 1/04 60/39.17 |
| 2007/0240435 | A1 | 10/2007 | Elpem et al. | |
| 2008/0256975 | A1 * | 10/2008 | Lifson | F25B 1/10 62/510 |
| 2010/0032133 | A1 * | 2/2010 | Lifson | F25B 1/10 165/62 |
| 2010/0071407 | A1 * | 3/2010 | Taras | F24F 3/153 62/507 |
| 2012/0156028 | A1 | 6/2012 | Colson et al. | |
| 2014/0199167 | A1 | 7/2014 | Beers et al. | |
| 2015/0298024 | A1 * | 10/2015 | Watkins | B01D 3/146 203/24 |

* cited by examiner

ENGINE DRIVEN AIR COMPRESSOR
SYSTEM FOR A MOBILE AVIATION
SUPPORT CART

This application claims the benefit of U.S. provisional application Ser. No. 62/384,949 filed Sep. 8, 2016, the disclosure of which is hereby incorporated in its entirety by reference herein.

TECHNICAL FIELD

This disclosure is directed to an engine-driven compressor system for a ground-based aviation support cart that supplies power and/or air to an aircraft while the aircraft is grounded.

BACKGROUND

Portable ground-based aviation support carts are widely used in global aviation operations in both commercial and military applications. Various forms of support carts have populated the market to supply various key functions to the aircraft while on the ground at terminals, or while simply on the ramp. These functions include electrical ground power, typically of 400 Hz 3-phase form, air conditioning, or even high pressure "bleed air" for the purpose of starting jet engines. These functions if supplied by ground-based equipment then obviate the need for operating the aircraft onboard auxiliary power unit (APU). The latter is in many cases undesirable to operate while on the ground as fuel consumption rates and therefore operating costs are very high, notwithstanding any environmental footprint resulting from otherwise untreated emissions.

The various important support functions are typically provided by multiple carts, requiring the towing and handling by multiple tractors/tugs with requisite personnel. For example, carts that supply solely air conditioning must be augmented by other carts for supplying ground power, and even a third cart would be needed if bleed air is required for engine starting. One example which enjoys widespread operation in military environments is the A/M32A-60B ("dash 60") cart, which supplies both 60 kW power or high pressure bleed air for engine starting. Neither of these functions may be supplied concurrently however, and a secondary piece of equipment is required if air conditioning is needed. The dash-60 further employs use of a non-recuped gas turbine engine exhibiting extremely high specific fuel consumption. Modern compression ignition (diesel) engines consume $\frac{1}{3}^{rd}$ or less fuel for the same power output and thus are a far more efficient power source.

SUMMARY

In one embodiment, an engine-driven compressor system for use in a ground-based aviation support cart is provided. The compressor system includes an internal combustion engine, and a first air compressor and a second air compressor that provide two stages of air compression along an air flow path. A heat exchanger is provided in the air flow path between the first air compressor and the second air compressor. A generator is configured to convert rotational movement into electric energy. A transmission is driven by the engine. The first air compressor, the second air compressor, and the generator component are coupled to and driven by the transmission.

The compressor system may also include a discharge port configured to connect to ducting connected to an aircraft to provide cooled, pressurized air to the aircraft during ground operations. The pressurized air that may be discharged from the discharge port is at least 35 psig. The compressor system may also include an air flow divider configured to direct high pressure air output to the discharge port and lower pressure air output to equipment integral to the aviation support cart.

An air flow divider may take pressurized air from the two compressors, and divide it from there; some of the pressurized air may flow directly to the grounded aircraft, and some of the pressurized air may flow through a turbo compressor unit having a turbine, compressor, and heat exchanger. Air from the turbo compressor unit can then flow to duct work to cool the grounded air craft cabin.

According to another embodiment, an engine-driven compressor system for use in a ground-based aviation support cart is provided. The compressor system includes an engine, and a transmission coupled to and driven by the engine. A first air compressor is disposed in an air flow path and configured to provide a first stage of air compression. The first air compressor is directly coupled to and driven by the transmission. A second air compressor is disposed in the air flow path downstream of the first air compressor and is configured to provide a second stage of air compression. The second air compressor is directly coupled to and driven by the transmission. Each of the first and second air compressors is a centrifugal compressor. A heat exchanger is provided in the air flow path between the first air compressor and the second air compressor. A high-pressure output conduit is configured to output high-pressure air from the air flow path. A low-pressure output conduit is configured to output low-pressure air from the air flow path. The low-pressure output conduit further includes a turbo compressor unit having a turbine expander and at least two heat exchangers.

In yet another embodiment, a ground-based aviation support cart for supplying air to a grounded aircraft is provided. The support cart includes an internal combustion engine. A first air compressor is driven by the engine, is disposed in an air flow path and is configured to provide a first stage of air compression. A second air compressor is driven by the engine, is disposed in the air flow path downstream of the first air compressor, and is configured to provide a second stage of air compression.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. The figures and descriptions presented herein refer to one or more embodiments and are not to be taken as limiting or confining the invention to only what is illustrated.

Figure 1:
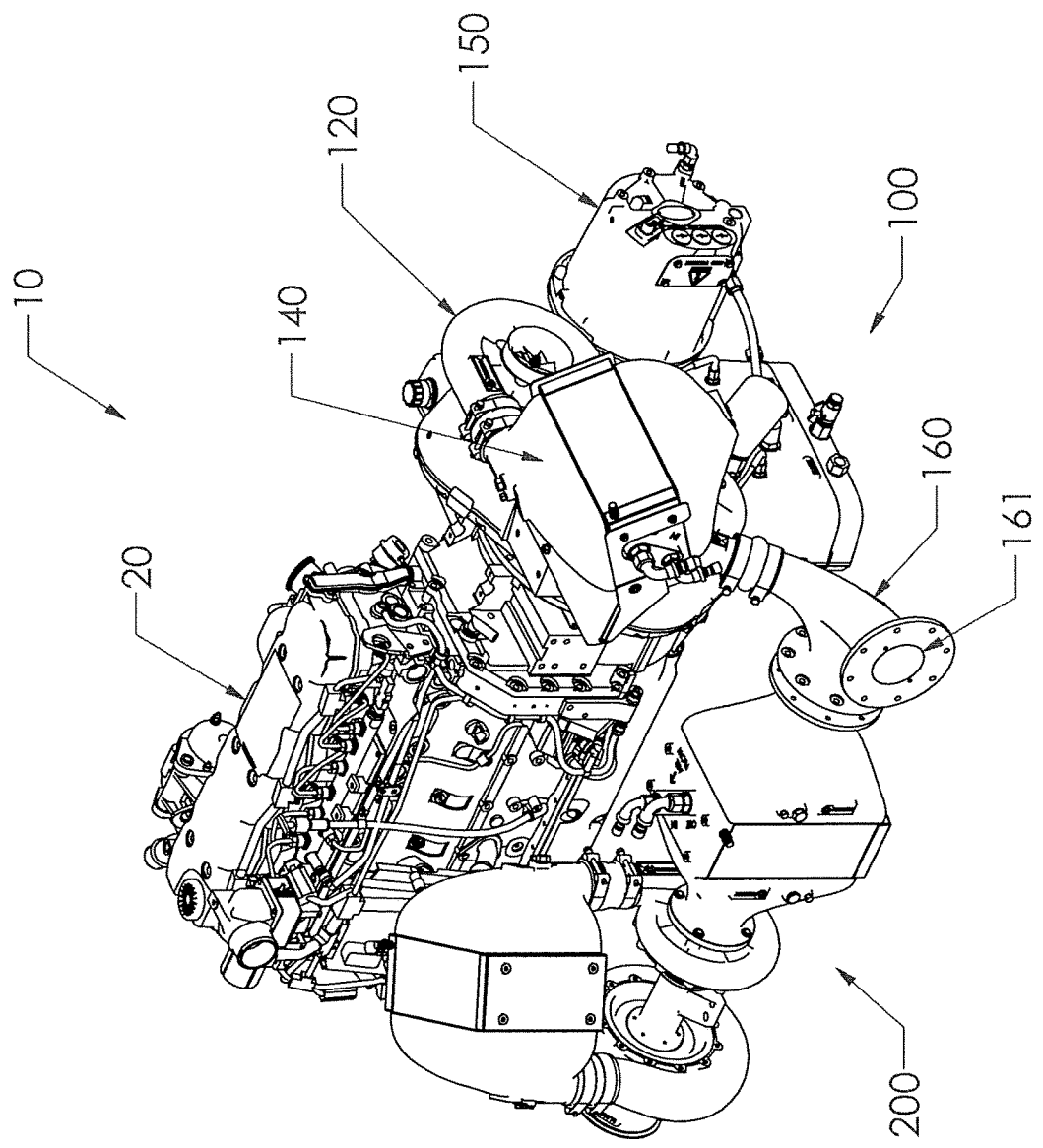
FIG. 1 is a front perspective view of an engine-driven air compression system for a ground-based aviation support cart, according to one embodiment.
Figure 1A:
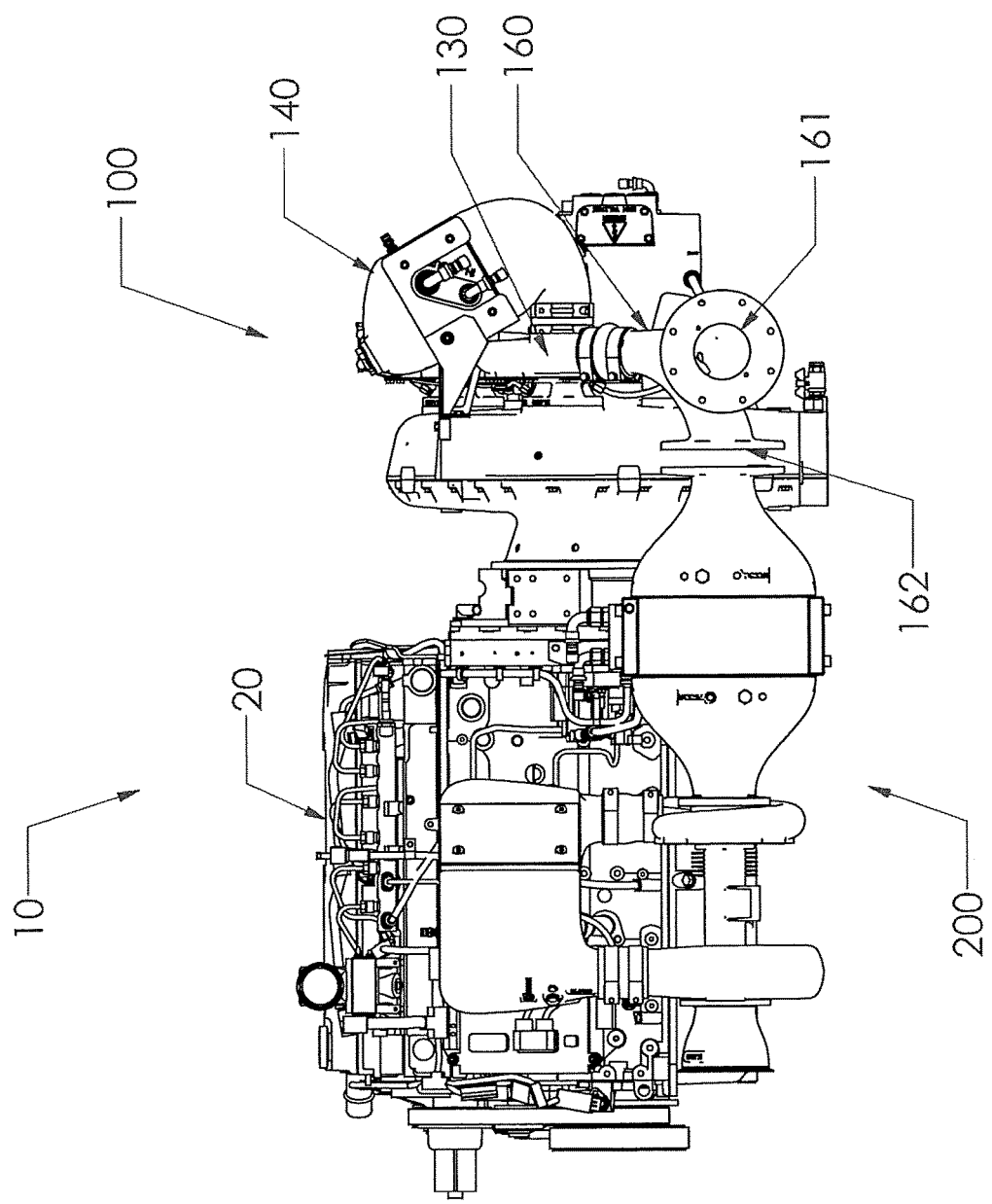
FIG. 1A is a side view of the engine-driven air compression system of FIG. 1.

Starting with FIGS. 1 and 1A, a representative embodiment of an engine-driven air compressor system generally indicated at 10 for use in a ground-based, mobile aviation support cart. An assembly 100 includes, in one non-limiting embodiment, a 2-stage centrifugal compressor system, with one stage of air compression labeled at 120 and the other stage of air compression labeled at 130. The system includes a compact, high performance liquid-to-air type intercooling heat exchanger 140, a compact permanent magnet, synchronous generator component 150, an air flow divider manifold 160, and a heat exchanger and turbo compressor module 200. An internal combustion engine 20 connects directly to compressor assembly 100 at the bellhousing. In the non-limiting embodiment shown, the engine 20 is a 6-cylinder, 6.7-liter displacement diesel type, of 230 horsepower rating. The heat exchanger assembly 140 is of a compact, high performance, liquid-to-air design, and is mounted directly between the outlet/discharge of first stage compressor 120, and inlet of second stage compressor 130. The heat exchanger 140 is further of a cross-counter-flow design which results in exceptional thermal performance; effectiveness performance ranging between 0.85 and 0.95 can be provided. It also known that any pressure loss between first and second compressor stages 120, 130, or additional stages for that matter, will impact system performance significantly. For example, a 1 psi loss between the stages may require an additional 6-7 HP of engine work to compensate. For this reason, the heat exchanger and manifolds are constructed and positioned directly between compression stages, with any air manifold and/or piping losses absolutely minimized. Test data on the illustrated embodiment has consistently shown inter-stage pressure loss of substantially less than 0.50 psi.

Figure 2:
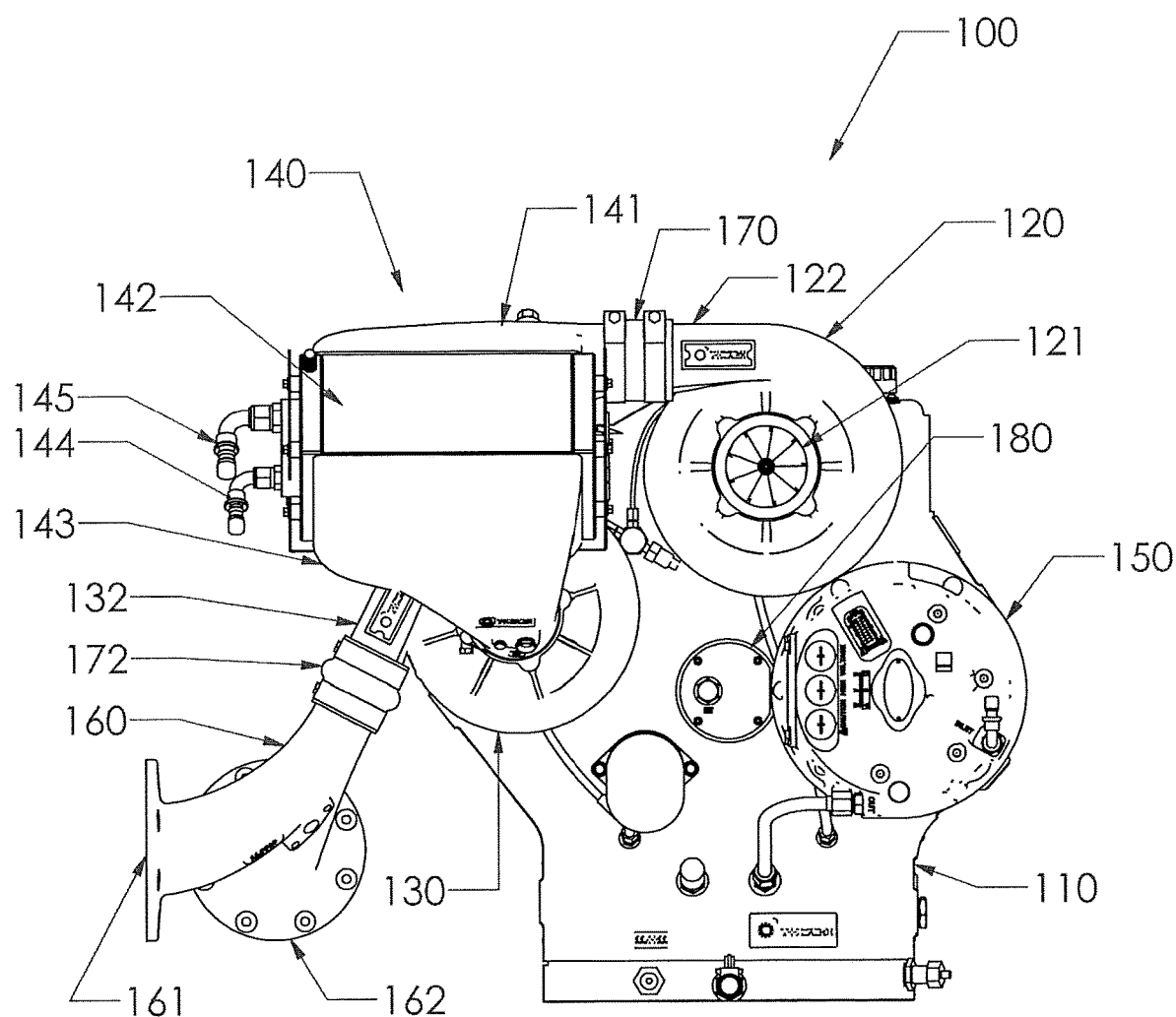
FIG. 2 is a front view of the engine-driven air compression system of FIG. 1, illustrating a multi-stage, intercooled centrifugal stage air compressor system with an integral generator component attached, according to one embodiment.

FIG. 2 more clearly shows the centrifugal compressor and intercooler components. Air from ambient enters centrifugal stage 120 at inlet 121. Although not illustrated, an upstream inlet air filtration may be optionally installed. Depending on engine, and hence impeller speed, air is compressed at up to 2.5 pressure ratio, discharging at volute exit 122. A flexible sleeve and clamp arrangement 170 connects the intercooling heat exchanger assembly 140 at an inlet manifold nozzle 141. Compressed air is immediately guided into a liquid-air core 142 for cooling the compressed air and rejecting significant heat of compression temperature rise. The core 142 is further of a cross-counter-flow type design, resulting in significant performance gain. Cooling liquid is supplied via a recirculating pump and radiator cooling system, entering at fluid connection 144. The coolant may further be of commonly available and preferred types and mixtures including, but not limited to water and glycol mixtures. Warmed coolant exits at fluid connection 145, returning to the externally mounted radiator (not shown) for discharging thermal loads to the ambient.

Figure 4:
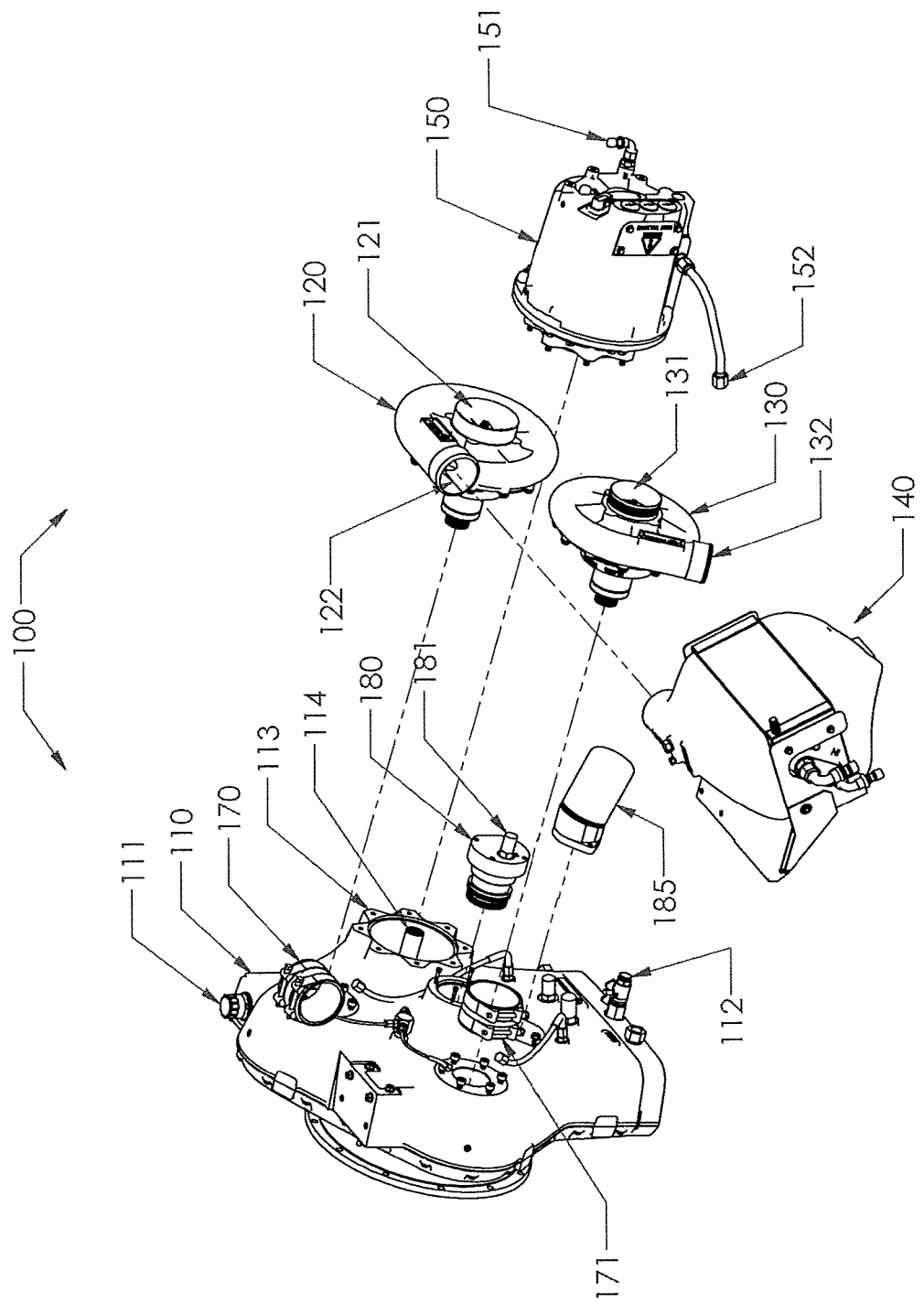
FIG. 4 is an exploded perspective view of a 2-stage air compression, intercooled embodiment, with the detachable generator component, which further depicts detachable centrifugal compressor stages and an oil pump assembly, according to one embodiment.

Cooled air exits core 142 and discharges into manifold 143, which is constructed to direct cooled and pressurized air immediately into the second air compressor stage 130, entering at nozzle connection 131, seen in FIG. 4. Connection is accomplished by flexible sleeve and clamp arrangement 171, also seen in FIG. 4. The second compressor stage 130 provides additional compression of up to 2.5 pressure ratio, with high pressure air exiting at volute discharge 132. A flexible sleeve and clamp arrangement 172 provides connection to a flow divider manifold 160. The divider 160 is further equipped with a pair of mounting flanges 161 and 162 which provide connection points for valves (not shown), other equipment, or in the event of bleed-air engine starting, directly to the aircraft. The connection at 161 may be preferable for bleed-air functions, while the connection at 162 may be preferable for connection to, in one preferred embodiment, turbo compressor air cooling module 200 as shown in FIGS. 1 and 1A. The use of appropriately designed centrifugal compressor stages and liquid-air intercooling is highly advantageous. In one embodiment, overall compression ratios of up to 5.0 have been demonstrated with discharge temperatures under 350° F., on a 95° F. day.

Referring now to FIG. 4, additional features of the compressor system 100 may now be seen. A transmission 110 incorporates a wet-lubricated, gear-train arrangement to convert the relatively low input speed of the combustion engine to the relatively high speeds required by the centrifugal compressor stages 120 and 130. Lubricant is preferably a synthetic oil of appropriate viscosity and properties suitable for gear and rolling element bearing applications. A lubricating pump 180 is externally mountable and provides for necessary pressurized oil lubrication of transmission internal components, compressor stages 120 and 130, and, in a preferred embodiment, generator component 150. The transmission 110 also incorporates an internal sump (not shown) with an oil fill point 111 and a drain point 112. Also included (not shown) are numerous internal lubrication circuits, conduits, directed flow elements, flow restricting orifii, and pressure reliefs for the purposes of ensuring optimum lubrication for all critical internal elements. A filter assembly 185 includes a spin-on type of high efficiency element for continuous filtration of all internally supplied lubricant. Pump 180 further comprises two individual pumping stages; a higher pressure low-flow circuit supplies lubricant to all transmission internal elements via filter module 113, while a lower pressure, higher flow stage supplies lubricant at connection point 181 for the purposes of external cooling (not shown) additional filtration stage (not shown) and returning to provide lubrication and cooling to generator component 150, connecting at port 151. Pump high pressure circuit provides approximately 80 psig oil pressure and approximately 1 gallon per minute flowrate for transmission and compressor stage lubrication. In one embodiment, the pump high flow circuit at connection point 181 provides approximately 3 gallons per minute flowrate for external cooling, filtration, and delivery to the generator 150, connecting at port 151. Warmed generator lubricant drains and reconnects to transmission sump via port 152.

Figure 3:
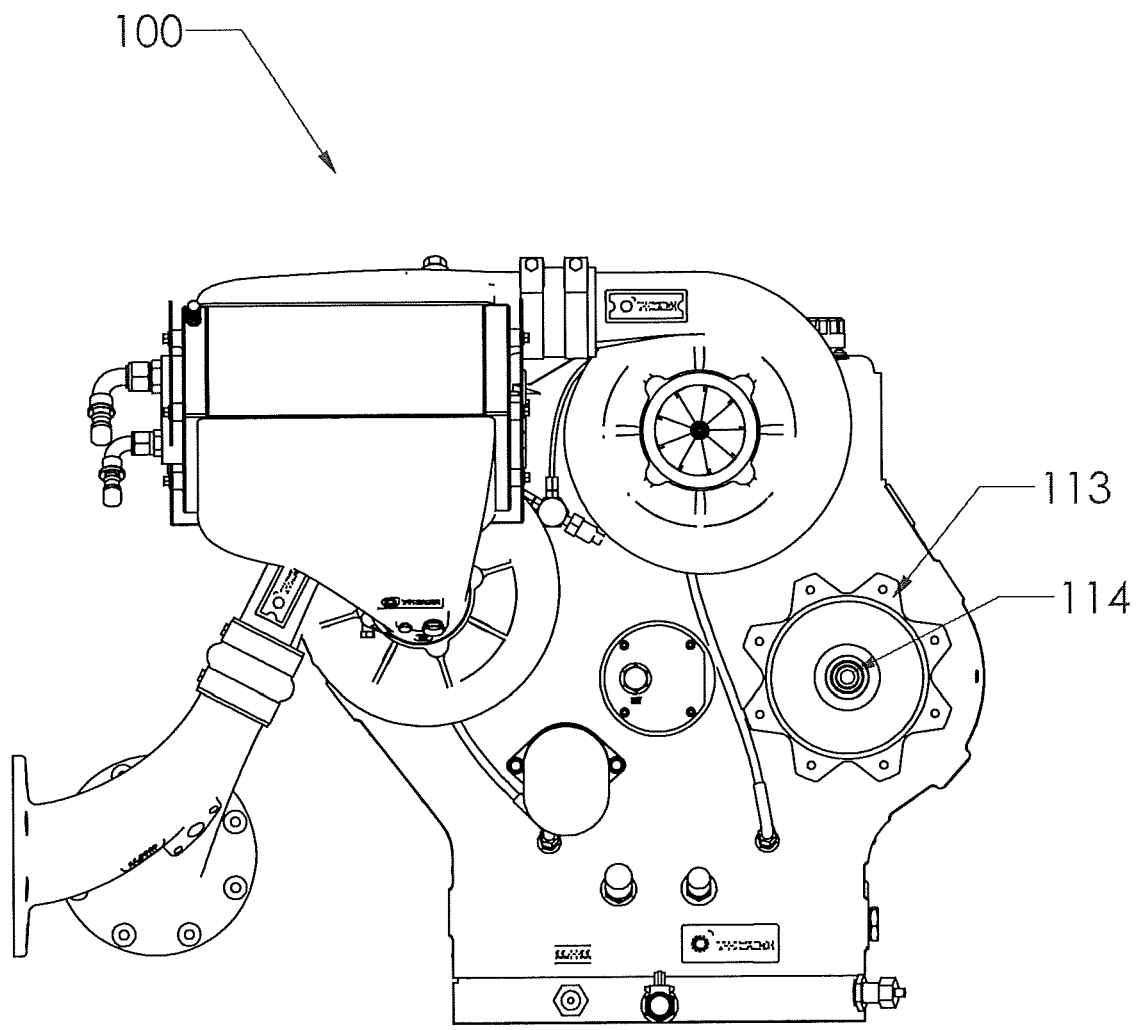
FIG. 3 illustrates the engine-driven air compression system of FIG. 2 without the generator component attached.

Referring again to FIG. 4, the compressor stages 120, 130, and generator 150 are all seen as externally mountable to transmission 110. This feature provides for ease of serviceability and field replacement of critical components, thereby minimizing downtime. FIG. 3 depicts another embodiment wherein the generator 150 is optionally removed for compressed air-only operation. Owing to the externally mountable component feature, system 100 is configurable without compromising performance or operability, and without limiting scope or novelty of the invention.

The generator 150 can be of a liquid-cooled, high-speed permanent magnet synchronous machine (PMSM) design. Higher shaft speeds are made possible by the power take-off mounting pad 113 incorporated into transmission 110, with direct-coupling splined shaft drive 114. In one embodiment, operating shaft speeds of 4,000-7,000 RPM are provided. The generator 150 is thus of exceptional power density and lightweight. In a preferred embodiment, the generator 150 comprises a 90 kW rated, 125-pound package. The generator 150 may further be wet lubricated (shown) or employ permanently lubricated, greased bearings, and this does not limit or detract in any novelty. In this latter embodiment, lubricant connections 151 and 152 are not used, and oil supply at 181 remains for an external cooling and filtration circuit, with return to the transmission sump by replacement of connection 152.

Figure 5:
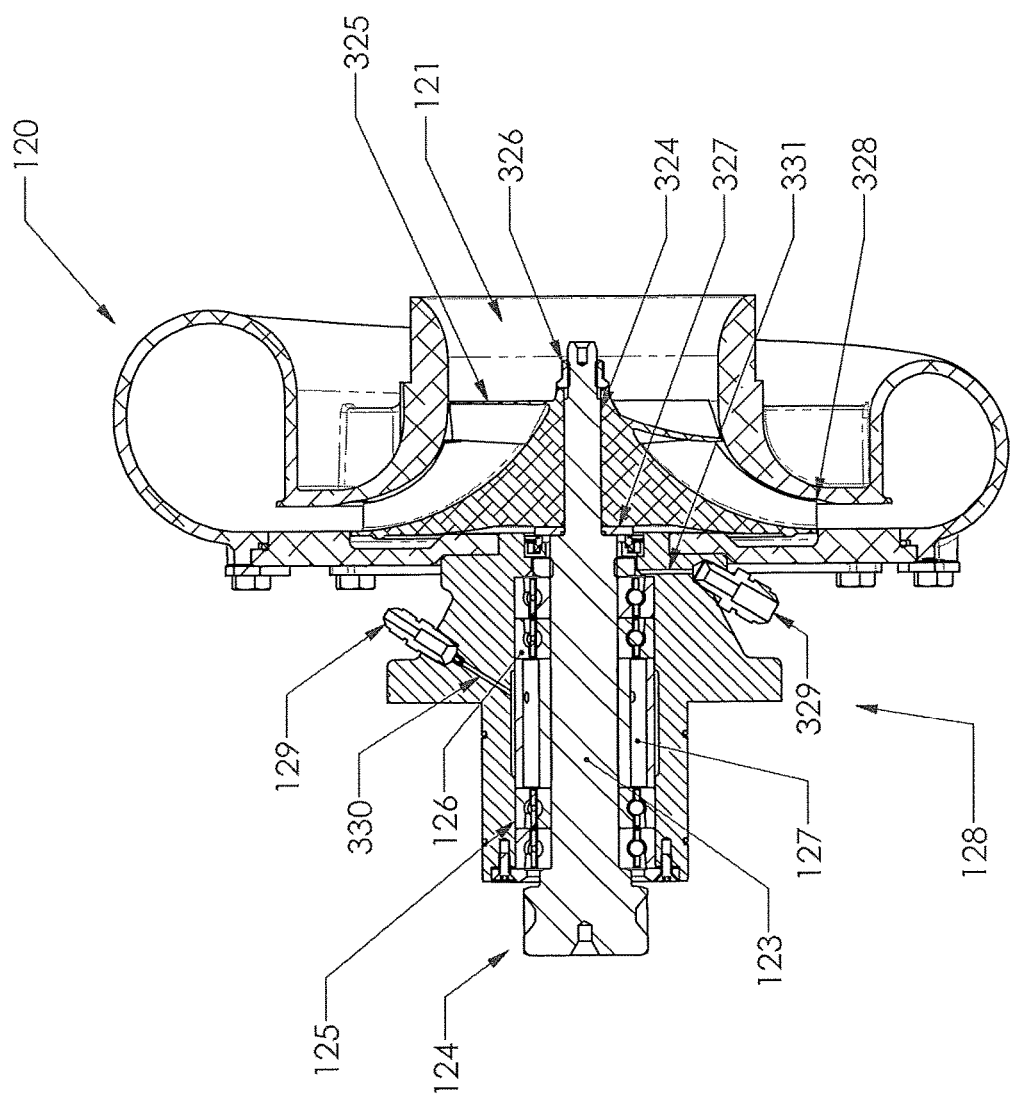
FIG. 5 is a cross-sectional view of a centrifugal compressor stage embodiment depicting input drive gear and a shaft-rotor assembly.

Referring now to FIG. 5, the first compressor stage 120, by way of example is illustrated. Combinations, variations, or "trims" of impeller and volute sets may be used in a non-limiting way, in order to accomplish the specific pressure rise and air flowrate objective. In this embodiment, stages 120 and 130 are both of similar design but again, this is non-limiting. Therefore, in one embodiment, descriptions of the first compressor stage 120 can be applied to the second compressor stage 130 and are not duplicated in description herein. A shaft 123 incorporates a pinion drive gear 124 which meshes internally to the transmission 110. At a distal end 324 of the shaft 123, an impeller 325 is mounted and secured by nut 326. Spacer and shim package 327 provides for precise assembly and adjustment of impeller-to-volute tip clearance 328. Rolling elements or bearing elements 125, 126 are provided, supporting shaft 123 in housing 128. Bearing elements 125 and 126 are further of high-speed angular contact type, and arranged in rigidly pre-loaded "DB" manner, separated by precision spacer set 127. Lubrication is provided at the port 129, with drain provided at port 329. Lubricant may also drain at pinion gear end 124 while being internal to transmission 110. Internal flow passages, conduits, and restrictors 330, 331 provide for optimum supply and drain of lubricant.

Figure 6:
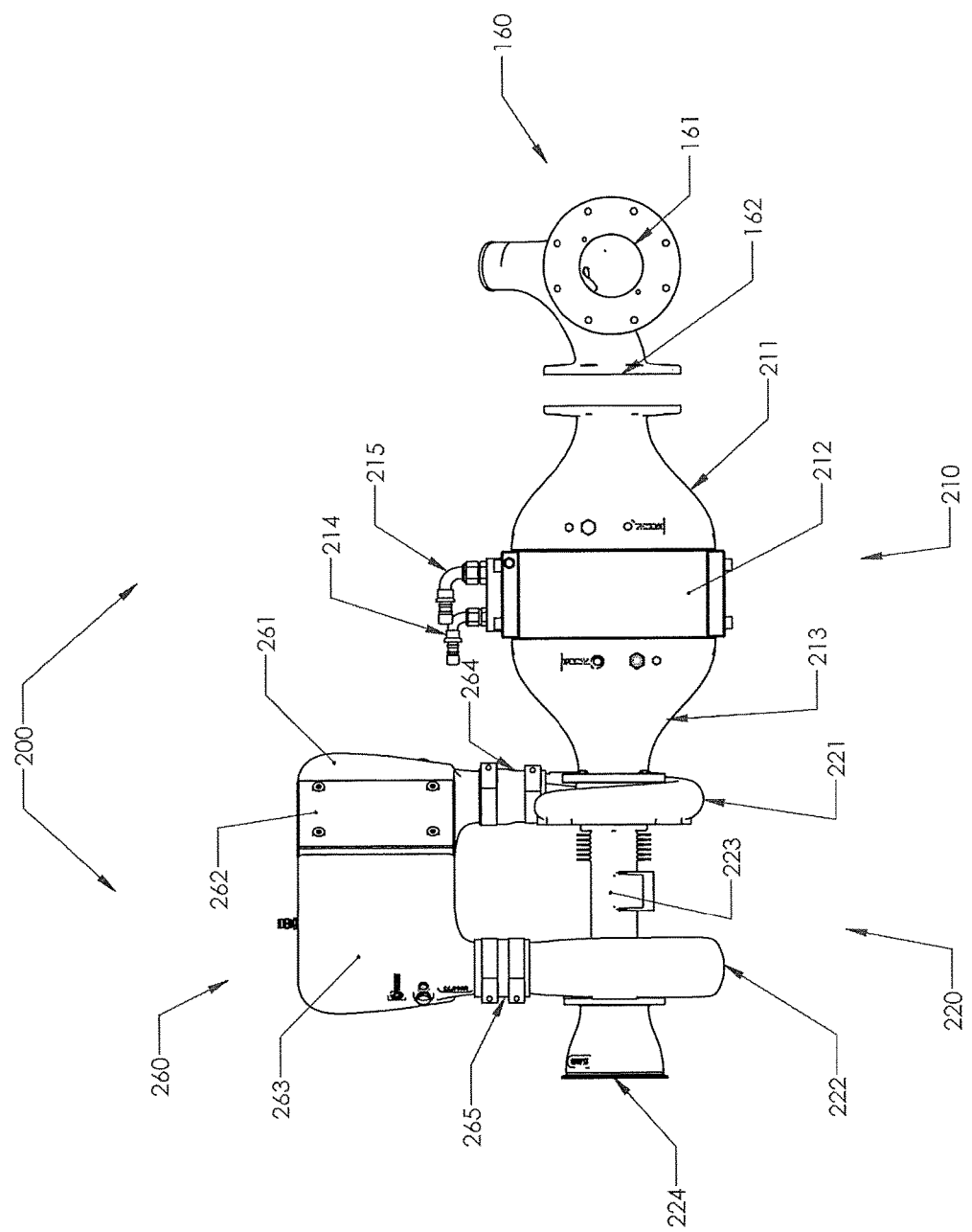
FIG. 6 is an elevation view of a turbo compressor with a heat exchanger system of the engine-driven air compression system, according to one embodiment.

Referring now to FIG. 6, the turbo compressor module 200 is shown. Basic components include an aftercooling heat exchanger assembly 210, a turbo compressor unit 220, and an intercooling heat exchanger assembly 260. In one embodiment, compressed air is introduced via a flow divider manifold 160, with flange connection to aftercooler heat exchanger assembly 210 at joint 162. Joint 162 may further include a valve (not shown) for the purpose of directing airflow through bleed air discharge port 161. Conversely, bleed air port 161 may also be equipped with a valve (not shown) in order to direct airflow through port 162 for turbo compressor module 200 operation. In a preferred embodiment and typical operation, air at approximately 20 psig and 220° F. is introduced at port 162. The heat exchanger assembly 210 is therefore positioned upstream of turbo compressor component 220 to cool this compressed air. The heat exchanger assembly 210 includes an inlet manifold 211, a liquid-air core 212, and a discharge manifold 213. The core 212 further includes cooling liquid connection ports 214 and 215, with cool liquid supplied at 214, and warm coolant discharged at 215. The core 212 is further of a compact, high performance cross-counter flow design, and air pressure loss through the core is extremely low, for example below 0.50 psi.

At the discharge manifold 213, pressurized air at approximately 20 psig is introduced to the turbo compressor unit 220. The turbo compressor unit 220 includes a high speed centrifugal compressor stage 221, an intermediate shaft-bearing-spindle assembly 223, a power recovery radial in-flow turbine 222, and a cold air discharge port 224. The compressor stage 221 provides additional pressurization of air that is introduced at the manifold 213. In one embodiment, the compressor 221 can operate between 1.4 and 1.8 pressure ratio. This additional compression incurs added temperature rise which is managed by an intercooling heat exchanger assembly 260. The heat exchanger assembly 260 is of similar construction to the heat exchanger assembly 210, and includes an air inlet manifold 261, a liquid-air type core 262, and an air discharge manifold 263. Cooling liquid supply and return ports are not shown, but are identical in nature to 214 and 215. Pressurized and cooled air is then introduced to turbine stage 222. In one embodiment, the turbine 222 is of a radial in-flow type design; it's purpose is to recover the significant energy available in the pressurized, cooled air, thereby resulting in substantially cooled air supply at the discharge port 224. The heat exchanger assembly 260 connects to the turbo compressor unit via flexible sleeve and clamp arrangements 264 and 265.

The discharge port 224 may then be connected via ducting (not shown) to an aircraft (not shown) for the purpose of providing cooled, low pressure air to the aircraft during ground operations.

In one embodiment, the turbo compressor unit 220 operates in a "bootstrap" mode, wherein both the compressor and turbine impellers are coupled to and operate on a common shaft. Energy extracted by the turbine 222 is therefore absorbed by the compressor 221, and this results in highly efficient operation. Further, significant air delivery pressures of between 2 and 5 psig are available at cold air discharge port 224. By way of example, and in a non-limiting sense, one embodiment results in the compressor 221 operating at approximately 1.7 pressure ratio, the turbine expander 222 operating at approximately 3.0 expansion ratio, with cooled discharge air of approximately 4 psig at 50° F. at port 224. Air flowrates of between 50 and 100 pounds per minute are attained, and the operating shaft speed of spindle 223 is approximately 36,000 revolutions per minute.

Figure 7:
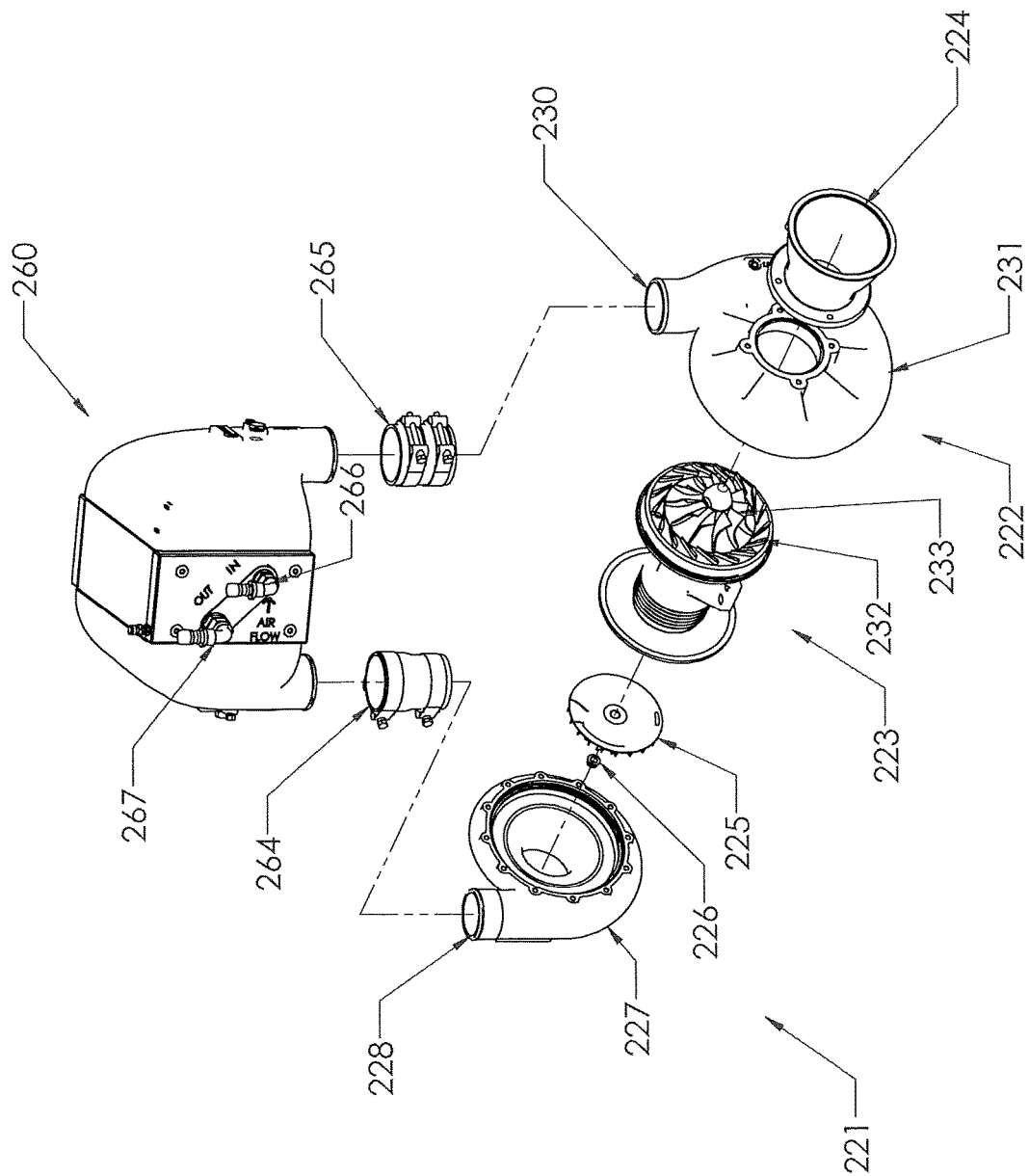
FIG. 7 is an exploded view of a bootstrap turbo compressor component, according to one embodiment.

Referring now to FIG. 7, the turbo compressor unit is seen in exploded view revealing additional detail. Cooled and pressurized air from heat exchanger unit 210 (FIG. 6) is introduced to the centrifugal compressor stage 221. The manifold 213 (FIG. 6) connects directly to a compressor volute 227. An impeller 225 is secured to a spindle shaft assembly 223 via a nut 226. Pressurized air is delivered at a volute exit nozzle 228, connecting to the intercooling heat exchanger unit 260 via a flexible sleeve and clamp arrangement 264. Another sleeve and clamp arrangement 265 connects the intercooling heat exchanger unit 260 to turbine expander stage 222, at nozzle (or connection port) 230. A turbine volute 231 collects and directs airflow into multi-vaned nozzle 232, accelerating air velocity, then discharging into turbine impeller 233 at the radial periphery. The entering pressurized, high velocity airstream has significant energy, which releases this energy in the form of rotational torque on the impeller 233. The impeller 233, in turn, drives the shaft-spindle arrangement 223, which is in turn directly connected to the compressor impeller 225. The impeller 225 is then rotatably driven, resulting in the "bootstrap" operation. As a result of the significant work energy absorbed by the impeller 233, a corresponding significant pressure and temperature drop is experienced between the connection port 230 and the cooled air discharge port 224. It should be noted that port 224 does not necessarily discharge to the ambient, but due to the significant upstream pressure available at connection port 230, some level of delivery pressure can be maintained at port 224. This, then, is the intended function of the cooled air delivery module 200 (FIG. 6).

In one embodiment, the intercooling heat exchanger unit 260 accepts cooling liquid on the cold side of the heat exchanger. Cooled liquid supply connects at port 266 while warmed coolant return connects at port 267. Adequate coolant flowrate should be maintained in order to maintain sufficiently high thermal performance of the heat exchanger 260. In one embodiment, coolant flowrates between 12 and 20 gallons per minute are present, noting that lower flowrates result in reduced thermal performance while higher flowrates result in increased performance. Control of air discharge temperature at port 224 is attained by regulating upstream air temperature at port 230. Temperature regulation at port 230 is attained by regulating thermal performance of the heat exchanger 260 via coolant flowrate supplied at port 266. In this manner, consistent and controllable air temperature delivery at port 224 is attainable over a wide range of ambient conditions.

The interactions between the volute 231, the nozzle 232, and the impeller 233 are important to achieve efficient aero-thermal performance. In one embodiment (shown), a fixed geometry nozzle 232 is positioned to accelerate airflow into the impeller 233. Nozzle geometry can therefore be adjusted in order to "tune" desired turbine expansion ratio and energy recovery over a desired flow range. In another embodiment (not shown), the nozzle 232 may be of a variable geometry type, wherein nozzle throat area and/or vane angle are adjustable in operation and controlled through external means such as a controller or processor. In this embodiment, the variable nozzle geometry provides additional control over turbine expansion ratio, air flowrate, and air discharge temperature.

Figure 8:
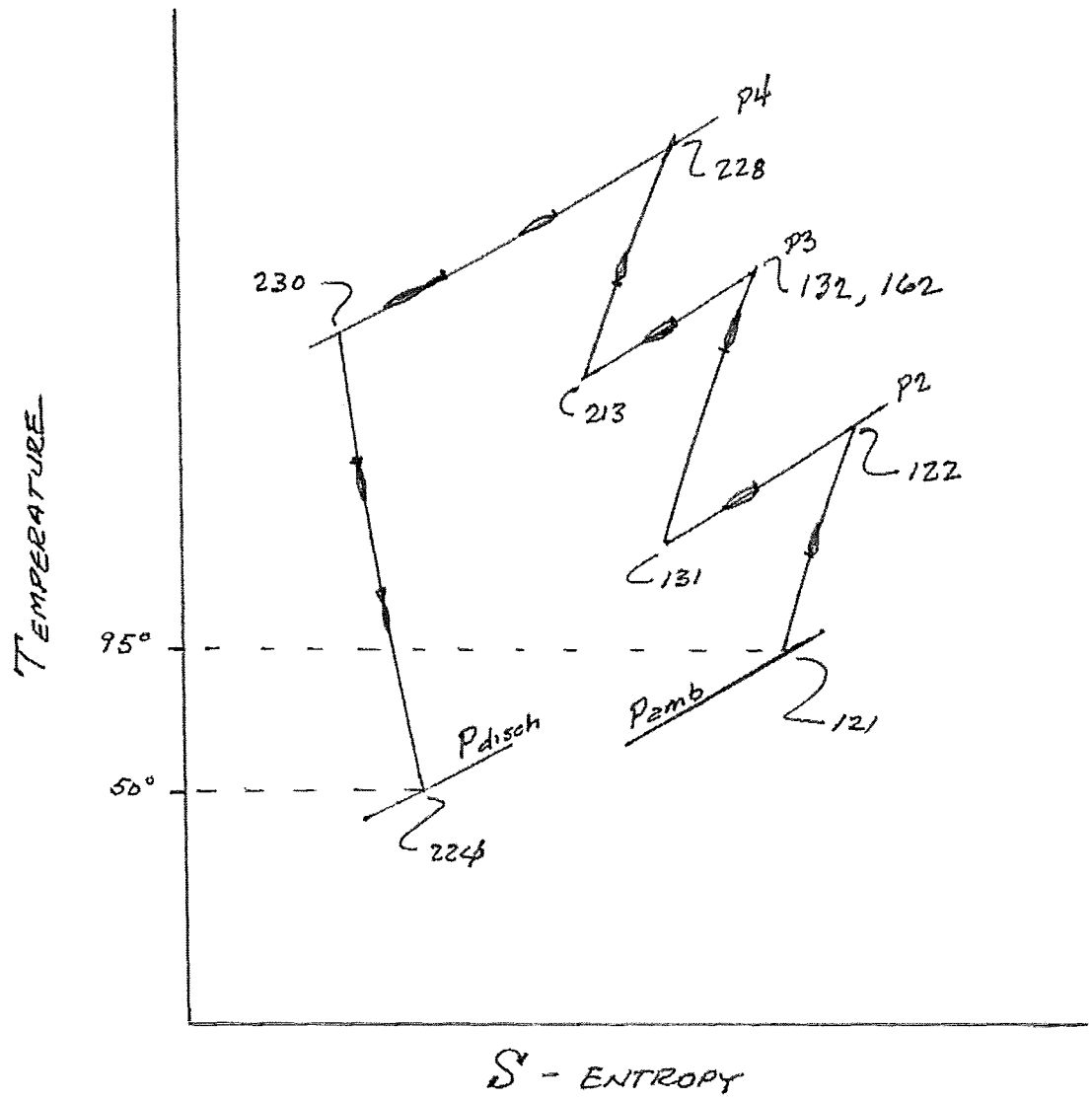
FIG. 8 is a graph of a temperature-entropy diagram illustrating a thermodynamic process of the system, according to one embodiment.

Referring to FIG. 8, the thermodynamic processes of the complete engine driven multi-stage compressor and novel turbo compressor module are mapped. FIG. 8 is presented in the form of the well-known temperature-entropy diagram, or TS diagram. Reference numbers shown in the graph and described in this paragraph are identical to certain components described above to show the change in temperature and entropy at each of these components along the air flow path; further reference to FIGS. 1, 4, 6 & 7 are also shown to aid in understanding the process. Air at ambient barometric pressure and temperature are provided at state 121 (FIGS. 1 and 4). The first compression stage results in increased pressure and temperature at state 122. The intercooler 140 (FIGS. 1, 2, and 4) reduces air temperature without significant pressure loss resulting in state 131. The second compressor stage results in pressure and temperature rise to state 132 (FIG. 4). The flow divider 160 (FIGS. 1, 2, and 6) directs airflow to state 162 without significant temperature change or pressure loss, thus making air properties at 132 and 162 approximately the same. The heat exchanger assembly 210 (FIG. 6) results in the state at 213. The compressor stage 221 (FIGS. 6 and 7) performs additional pressure and temperature rise resulting in state 228. The intercooler 260 (FIGS. 6 and 7) reduces air temperature without significant pressure loss resulting in state 230 (FIG. 7). Finally, cooled but pressurized air is directed into the turbine stage where significant energy is recovered resulting in the cooled-air discharge conditions at state 224 (FIGS. 6 and 7). Given dry air operation, state properties at all points on the TS diagram may be determined by the well-known polytropic compression and expansion equations of state. All compression and expansion process result in entropy increase, and this is due to the less than ideal, non-isentropic performance of the turbo machine stages. Given significantly humid air operation, all states are readily determined in the same manner except for the states between the turbine inlet 230 and the cooled air supply port 224 (FIG. 7). In this event, significant latent heat absorbed impacts the discharge air temperature, and condensed water may be produced.

The figures and descriptions presented herein refer to one or more embodiments and are not to be taken as limiting or confining the invention to only what is illustrated. In this sense, "multi-stage" may mean two or more stages of air compression, with inter-stage cooling particularly arranged. In one embodiment, two air compression stages are described with a single inter-stage heat exchanger. This embodiment can supply in excess of 100 pounds-per-minute of airflow at up to 50 psig delivery pressure, and at least 35 psig delivery pressure. Input shaft speeds of the combustion engine power source are limited by the particular engine, but may practically be provided in the 1,000-3,000 RPM range. Shaft speeds of the centrifugal compressor stages, on the other hand, can be in the 40,000 RPM range. Thus the transmission drive should provide 15:1 to 20:1 or more of total shaft speed increase. Higher engine speeds of approximately 2300 RPM should be provided to develop the high pressure "bleed air" needed for starting the jet engine. On the other hand, lower engine speeds of 1300-1700 RPM should be provided for lower pressure, 2-5 psig cooled air and/or electrical power output.

Several advantages are provided by the inventive embodiments described above. One purpose of the present disclosure is to provide multiple capabilities including pressurized air, cooled and pressurized air, and electrical power generation for a system to be used within a single mobile cart. Another purpose is to minimize package and payload in order to maximize portability and minimize use/need of towing tractors and operating personnel. A third purpose is to maximize operating efficiency in order to minimize fuel consumption, operating costs, and environmental footprint. A fourth purpose is to provide a system which can operate in several modes, with some concurrently, in order to minimize the inventory, logistic, and personnel requirements surrounding multiple separate pieces of equipment otherwise needed. The present disclosure accomplishes this through highly efficient centrifugal compressor and turbine stages, ultra-compact and high performance liquid-to-air heat exchangers, and compact permanent magnet generator. Compressor and generator functions are highly integrated into a unitary transmission drive, which is further direct-coupled to a highly efficient internal combustion engine. In one embodiment, and by way of example, a multistage intercooled compressor with integral transmission drive and 90 kW generator component weighs 475 pounds. An additional heat exchanger—turbo compressor module weighs 150 pounds, for a system total of 625 pounds. In comparison, an equivalent performing twin screw component available in the market can weigh 1625 pounds, and provides only high pressure bleed air capability. The reduced operating efficiency of a twin-screw component further requires a larger engine to drive it, resulting in further package and payload penalty. These realities present clear disadvantages if portability of ground equipment is to be maximized which, for example, is of particular interest in military operations.

The processes, methods, or algorithms disclosed herein can be deliverable to/implemented by a processing device, controller, or computer, which can include any existing programmable electronic control unit or dedicated electronic control unit. For example, the variable geometry turbine may be controlled by such a processing device, controller, or computer. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An engine-driven compressor system for use in a ground-based aviation support cart, the compressor system comprising:
   an internal combustion engine;
   a first air compressor and a second air compressor providing two stages of air compression along an air flow path;
   a heat exchanger provided in the air flow path between the first air compressor and the second air compressor;
   a generator configured to convert rotational movement into electric energy;
   a transmission driven by the engine and having gears configured to increase a rotational speed output by the engine; and
   a discharge port configured to connect to ducting connected to an aircraft to provide pressurized air to the aircraft during ground operations;
   wherein the first air compressor, the second air compressor, and the generator are coupled to and driven by the transmission.

2. The compressor system of claim 1, wherein the pressurized air discharged from the discharge port is at least 35 psig.

3. The compressor system of claim 1, further comprising an air flow divider configured to direct high pressure air output to the discharge port and low pressure air output to equipment integral to the aviation support cart.

4. The compressor system of claim 1, wherein the heat exchanger is a liquid-to-air type heat exchanger having a cross-counter flow core construction.

5. The compressor system of claim 1, wherein the first air compressor, the second air compressor, and the generator are externally mounted to the transmission and can be removed from the transmission without removing the transmission from the engine or disassembling the transmission.

6. The compressor system of claim 1, further comprising an externally-mounted recirculating oil pump configured to be removed and installed without disassembling the transmission.

7. An engine-driven compressor system for use in a ground-based aviation support cart, the compressor system comprising:
   an engine;
   a transmission coupled to and driven by the engine;
   a first air compressor disposed in an air flow path and configured to provide a first stage of air compression, the first air compressor directly coupled to and driven by the transmission, wherein no other air compressor is provided upstream of the first air compressor;
   a second air compressor disposed in the air flow path downstream of the first air compressor and configured to provide a second stage of air compression, the second air compressor directly coupled to and driven by the transmission, wherein each of the first and second air compressors is a centrifugal compressor;
   a heat exchanger provided in the air flow path between the first air compressor and the second air compressor; and
   a high-pressure output conduit configured to output high-pressure air from the air flow path, and a low-pressure output conduit configured to output low-pressure air from the air flow path, the low-pressure output conduit further including a turbo compressor unit having a turbine expander and at least two heat exchangers configured to reject heat, wherein the turbo compressor unit is further provided with a variable nozzle turbine with variable geometry controlled by a controller configured to regulate air flowrate, turbine expansion ratio, and turbine air discharge temperature.

8. The compressor system of claim 7, further comprising a generator configured to convert rotational movement into electric energy, wherein the first air compressor, the second air compressor, and the generator are coupled to and driven by the transmission.

9. The compressor system of claim 7, wherein the heat exchanger provided in the air flow path between the first air compressor and the second air compressor is a liquid-to-air type heat exchanger and is of a cross-counter flow type of core construction.

10. The compressor system of claim 7, wherein the low-pressure air output is at least 15 psig.

11. The compressor system of claim 7, wherein the at least two heat exchangers in the low-pressure output conduit are liquid-to-air type heat exchangers.

12. The compressor system of claim 7, wherein the turbo compressor unit includes a radial in-flow turbine stage and a centrifugal compressor stage, each coupled to a common shaft and rotatable about a common axis.

13. The compressor system of claim 7, further comprising a mobile support cart enabling the compressor system to move and connect to a grounded aircraft, wherein the support cart is equipped with a third heat exchanger, the third heat exchanger being a liquid-to-air type heat exchanger and being of a cross-counter type core design, and wherein all thermal loads from the at least two heat exchangers and the third heat exchanger are rejected to the ambient.

14. The compressor system of claim 13, further comprising a liquid cooling system, circulating coolant via one or more pumps and supplying coolant to the at least two heat exchangers and the third heat exchanger.

15. A ground-based aviation support cart for supplying air to a grounded aircraft, the support cart comprising:
   an internal combustion engine;
   a first air compressor driven by the engine, disposed in an air flow path, and configured to provide a first stage of air compression wherein no other air compressor is provided upstream of the first air compressor;
   a second air compressor driven by the engine, disposed in the air flow path downstream of the first air compressor, and configured to provide a second stage of air compression; and
   an air flow divider having an inlet receiving compressed air after being compressed by the second air compressor, the air flow divider further having a first outlet directing the compressed air to an engine of the grounded aircraft for starting the engine of the aircraft, and a second outlet directing air to a turbo compressor unit before being sent to the grounded aircraft.

16. The support cart of claim 15, further comprising a generator and a transmission driven by the engine, wherein the first air compressor, the second air compressor, and the generator are coupled to and driven by the transmission.

17. The support cart of claim 15, wherein the turbo compressor unit includes a turbine and a compressor coupled to and operated on a common shaft.

* * * * *